United States Patent

Zachariadis et al.

[11] Patent Number: 5,285,423
[45] Date of Patent: Feb. 8, 1994

[54] METHOD OF BROADLINE SEISMIC DATA ACQUISITION

[75] Inventors: Robert G. Zachariadis, Dallas; Sam C. Ting, Carrollton, both of Tex.

[73] Assignee: Mobil Oil Corporation, Fairfax, Va.

[21] Appl. No.: 6,546

[22] Filed: Jan. 22, 1993

[51] Int. Cl.$^5$ .............................. G01V 1/00
[52] U.S. Cl. .................... 367/56; 367/58; 181/112
[58] Field of Search ............ 181/112; 367/56, 58, 367/59, 62

[56] References Cited

U.S. PATENT DOCUMENTS

| | | | |
|---|---|---|---|
| 3,601,790 | 8/1971 | Sasseen | 340/15.5 |
| 3,746,122 | 7/1973 | Davis | 181/0.5 R |
| 3,753,222 | 8/1973 | Trostle | 340/15.5 MC |
| 3,867,713 | 2/1975 | Tegland et al. | 367/56 |
| 4,001,770 | 1/1977 | Hofer | 340/15.5 MC |
| 4,403,312 | 9/1983 | Thomason | 367/56 |
| 4,933,912 | 6/1990 | Gallagher | 367/59 |
| 5,029,145 | 7/1991 | Marsden et al. | 367/56 |

Primary Examiner—J. Woodrow Eldred
Attorney, Agent, or Firm—Alexander J. McKillop; George W. Hager, Jr.

[57] ABSTRACT

A broadline seismic survey is carried out by positioning a plurality of areal arrays of seismic detectors along each of a plurality of broadline receiver lines along the surface of the earth. Array centers along an inline direction of each receiver line are staggered by one-half of an array interval from array centers along the inline direction of adjacent receiver lines. Each detector array on a given receiver line is elongated in a cross-line direction to such receiver line to effect an areal array coverage between broadline centers of the adjacent receiver lines being on opposite sides of the given receiver line. The seismic detectors in each array are connected in common to a recording means.

15 Claims, 5 Drawing Sheets

GEOPHONE GROUP LENGTHS

GEOPHONE GROUP INTERVALS

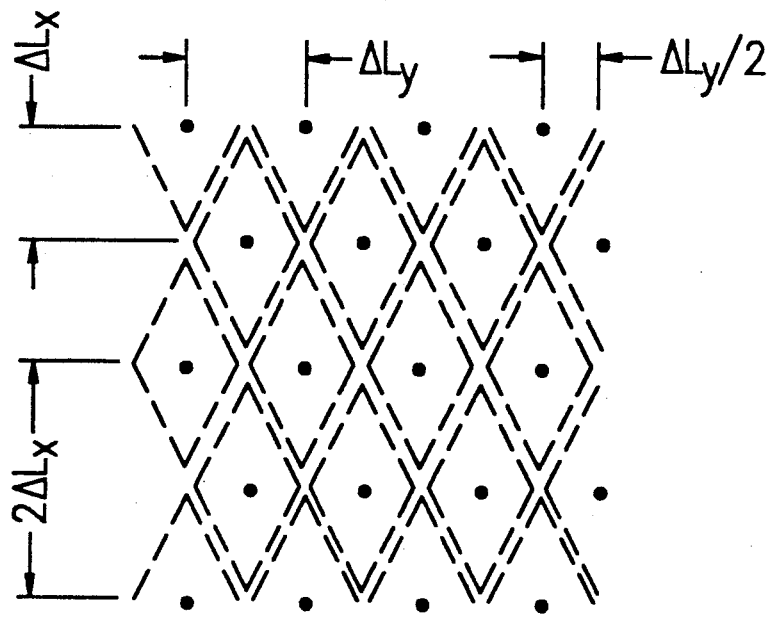
FIG. 5
FIG. 8
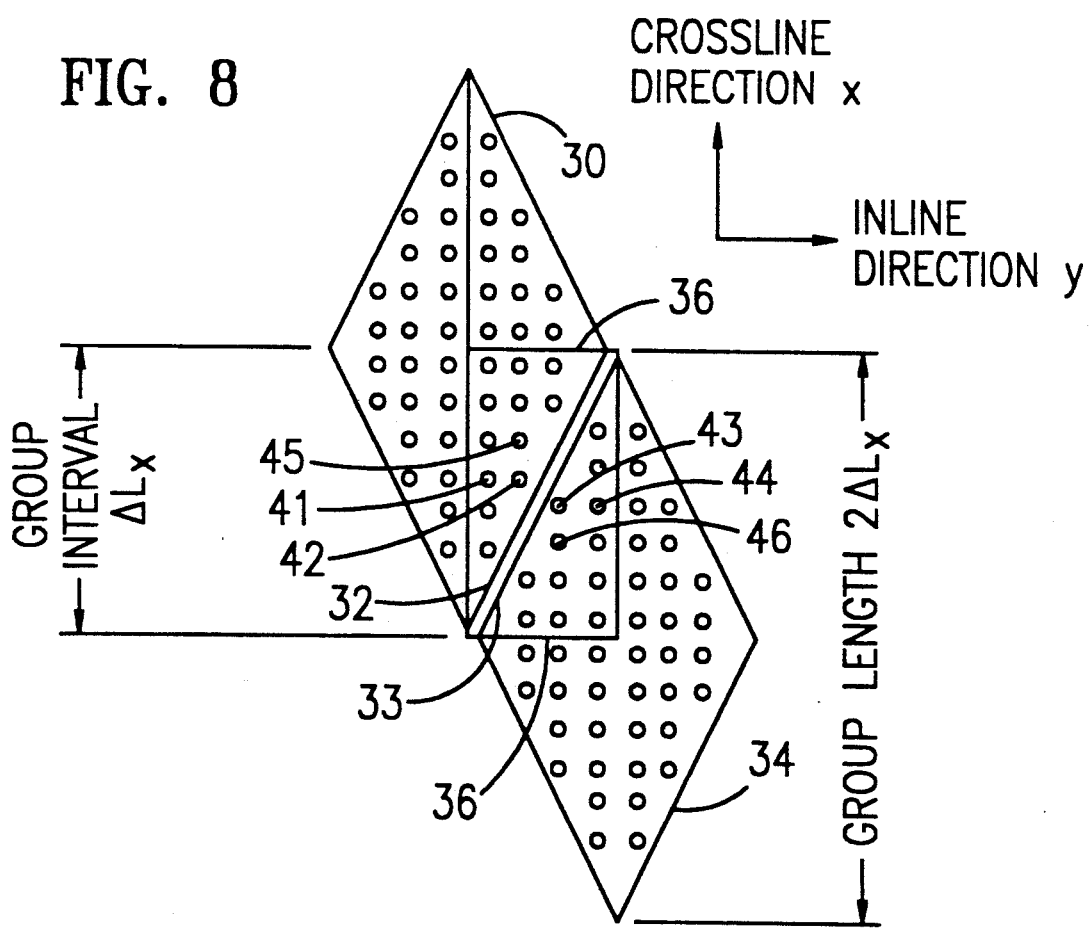

METHOD OF BROADLINE SEISMIC DATA ACQUISITION

BACKGROUND OF THE INVENTION

It has been for many years common practice in the art of geophysical exploration for oil, gas and other minerals to perform seismic exploration of the earth's subterranean structure. From knowledge of the shapes of various layers of differing types of rocks in the earth's crust, experienced geophysicists can deduce the possible presence of various valuable minerals such as oil and gas. Seismic techniques generally involve the generation of a source of acoustic energy such as a blast of dynamite, the dropping of a heavy weight on the earth's surface or imparting of a mechanical vibration to the earth, the so-called "Vibroseis" technique.

However generated, the acoustic energy travels downwardly through the earth and is reflected at the interfaces between differing layers of rock and returns upwardly to the earth's surface. The return of the waves of acoustic energy is detected by one or more geophones placed on the earth's surface. The time taken for the wave to travel downwardly, be reflected, and return upwardly, is measured and the time is proportional to the depth of the interface from which the wave was reflected between successive layers of rock beneath the earth's surface. Additional time measurements are then made with the source of acoustic energy and the detector spaced a distance from the first; comparison of the times taken by the first and second waves yields an indication of the change in the depth of the interface between the rock layers as the source and detectors move from one location to the next. If the outputs of the detectors are properly processed and are graphed in accordance with the relative positions of source and detector, a representation of a cross-section of the earth results, on which the interfaces between rock layers appear as deflections on the individual output lies, or "traces".

Much seismic exploration has been carried out so as to provide a record indicative of a cross-section of the earth taken along a line of exploration. That is, the exploration has been generally linear. See U.S. Pat. No. 3,240,286 to Musgrave. However, it has been increasingly desirable to provide a more detailed picture of the subsurface of the earth; hence three-dimensional techniques have more recently been developed. See for example U.S. Pat. No. 4,403,312 to Thomason. In the Thomason technique, a plurality of arrays of detectors broaden the lines of exploration to yield a three-dimensional picture of the subsurface data.

SUMMARY OF THE INVENTION

In accordance with the present invention, there is provided a method for broadline seismic surveying of subsurface earth formations.

A plurality of areal arrays of seismic detectors are positioned along each of a plurality of parallel, broadline receiver lines along the surface of the earth. Array centers along an inline direction of each receiver line are staggered by one-half of an array interval from array centers along the inline direction of adjacent receiver lines. Each detector array on a given receiver line is elongated in a crossline direction to said receiver line to effect an areal array coverage between broadline centers of the adjacent receiver lines being on opposite sides of the given receiver line. The seismic detectors in each array are connected in common to a recording means.

In a further aspect, a plurality of seismic energy sources are positioned along a pair of source lines lying parallel to the receiver lines and on opposite sides of the outer receiver lines. These source lines are offset from the broadline centers of the outer receiver lines by one-half the offset between broadline centers of adjacent receiver lines. The sources are spaced along the source lines so as to be positioned midway between detector array centers of the outer receiver lines. Each seismic source may be a single seismic energy generator or may comprise an array of seismic energy generators.

In a yet further aspect the detector arrays are configured to effect a diamond-like areal array coverage. Such detector arrays are positioned in sequential juxtaposition at one of their pairs of apexes along each of the receiver lines and in juxtaposition along their sides with the areal arrays on adjacent receiver lines.

BRIEF DESCRIPTION OF THE DRAWINGS

FIG. 5 illustrates a geophone array layout for the broadline seismic survey of the present invention.

FIG. 8 illustrates in more detail a pair of juxtapositioned geophone arrays of FIG. 5.

DESCRIPTION OF THE PREFERRED EMBODIMENT

Figure 1:
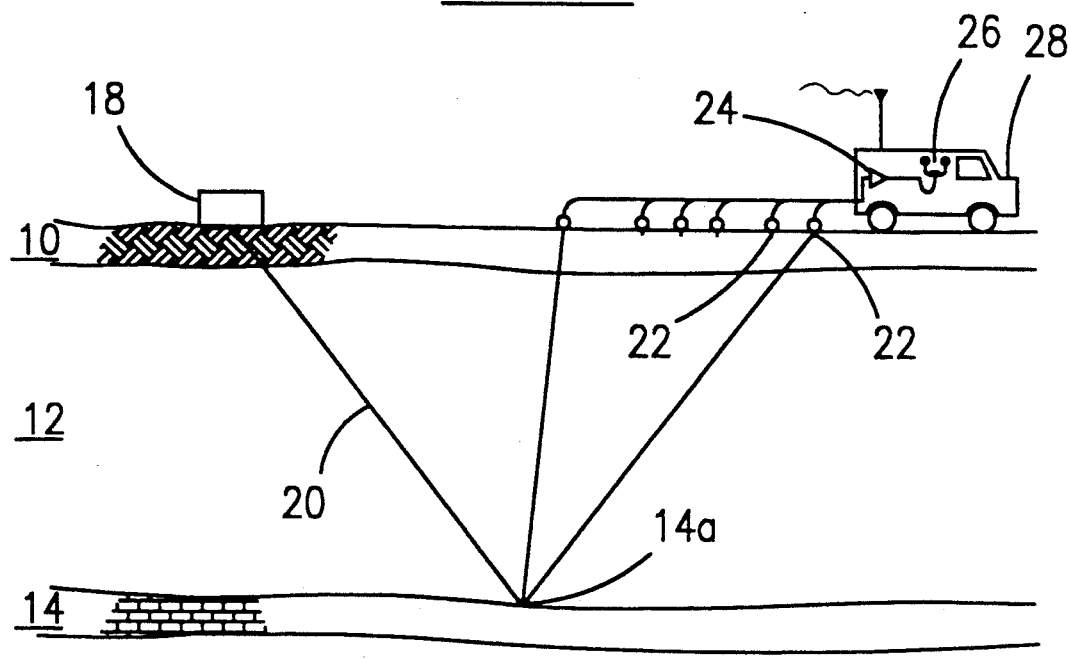
FIG. 1 illustrates a seismic survey technique of the prior art.

Referring now to FIG. 1 an overall view of a prior art seismic exploration operation is shown. The figure depicts a generally cross-sectional view of the earth which shows a surface layer 10, subsurface layers 12 and a lower reflecting layer 14. Seismic energy from a seismic source 18 is transmitted along a line indicated generally at 20 downwardly into the earth, is reflected from layer 14 at a common depth point 14a, and passes back upwardly through the earth where it is detected by one or more of a plurality of geophones 22. The signal output of each geophone 22 is amplified by an amplifier 24 and recorded on a data recording unit 26 carried in an exploration truck 28.

Figure 2:
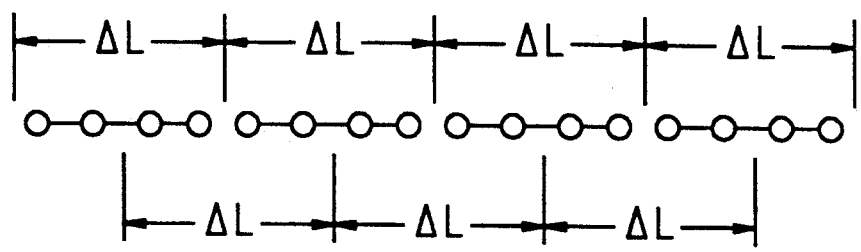
FIG. 2 illustrates a typical linear seismic receiver line.
Figure 3:
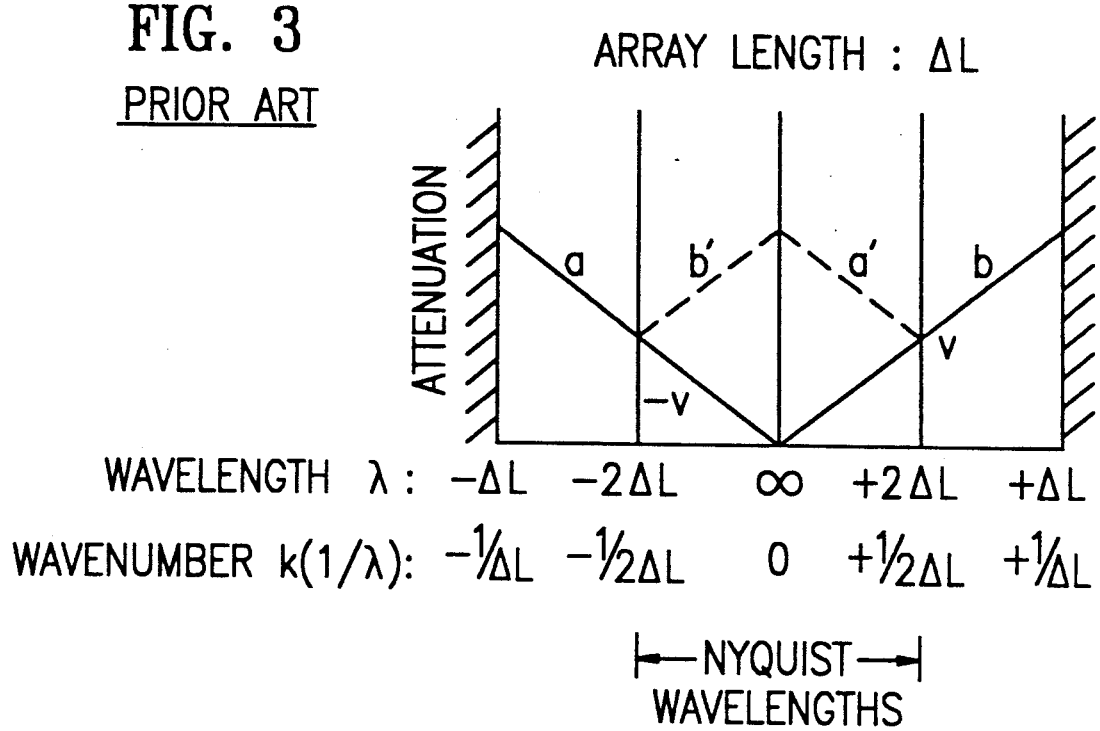
FIGS. 3, 6 and 7 represent attenuation versus wavelength for various geophone array lengths.

In practice, several geophones 22 are connected together in groups along a receiver line as shown graphically in FIG. 2, thus electrically summing their outputs. Geophone group lengths $\Delta L$ are generally equal to geophone group interval $\Delta L$ and the geophones are evenly spaced along the groups and across the gaps between groups. Referring to FIG. 3 for a horizontally traveling surface wave with apparent velocity V, wavelengths $\lambda$ (wave numbers $K=1/\lambda$) a and b between $+\Delta L$ and $2\Delta L$ ($\pm 1/\Delta L$ and $\pm\frac{1}{2}\Delta L$) will be abiased and appear as a' and b' in the wavelength (wave number) space between $-2\Delta L$ and $+2\Delta L$ ($-\frac{1}{2}\Delta L$ and $+\frac{1}{2}\Delta L$) where $\Delta L$ = geophone group interval, thus causing contamination of acquired seismic data. It is assumed that wavelengths shorter than $\pm\Delta L$ (wave numbers of greater magnitude than $\pm 1/\Delta L$) will be attenuated by the geophone array.

Increasing the spatial sampling interval by halving both group length and group interval doubles the Nyquist frequency and essentially moves the abiased data in a higher frequency range. Thus abiasing is not avoided. In addition, doubling the number of geophone groups and recording channels (in order to obtain the same total linear coverage, i.e., offset) is costly. In practice, the geophone arrays are doubled in length, thereby yielding a 100% overlap while retaining the group spatial sampling interval $\Delta L$. Assuming that double wavelength geophone arrays attenuate sufficiently all wavelengths less than $\pm 2\Delta L$, there will be effectively no spatially abiased data in the inline direction. This technique has been used for linear receiver lines using linear geophone arrays.

In the case of broadline seismic data acquisition several seismic lines are laid out side-by-side and recorded simultaneously. For a true broadline, two-dimensional areal arrays of geophones are laid out along the surface of the earth so as to attenuate both inline and crossline noise.

Figure 4:
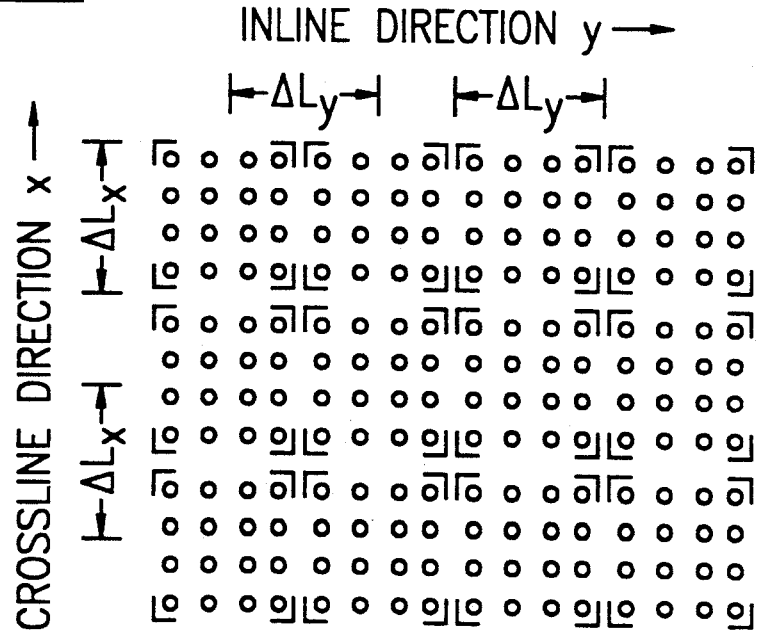
FIG. 4 illustrates a typical layout of geophone arrays in a broadline seismic survey.

With areal arrays as shown in FIG. 4, overlapping can be accomplished along one array direction, inline or crossline, but not both. In addition, the number of geophones in areal arrays tends to be larger than for linear arrays due to the need for covering the area and due to the limited length of wire between geophones on a typical string (i.e., usually 6, 8 or 12 geophones per string). The distance between geophones tends to be around 20-25 feet. Further, broadline surveys typically involve high channel capacity (i.e., greater than 360 channels) with correspondingly large numbers of geophones, thus increasing survey costs.

Figure 6:
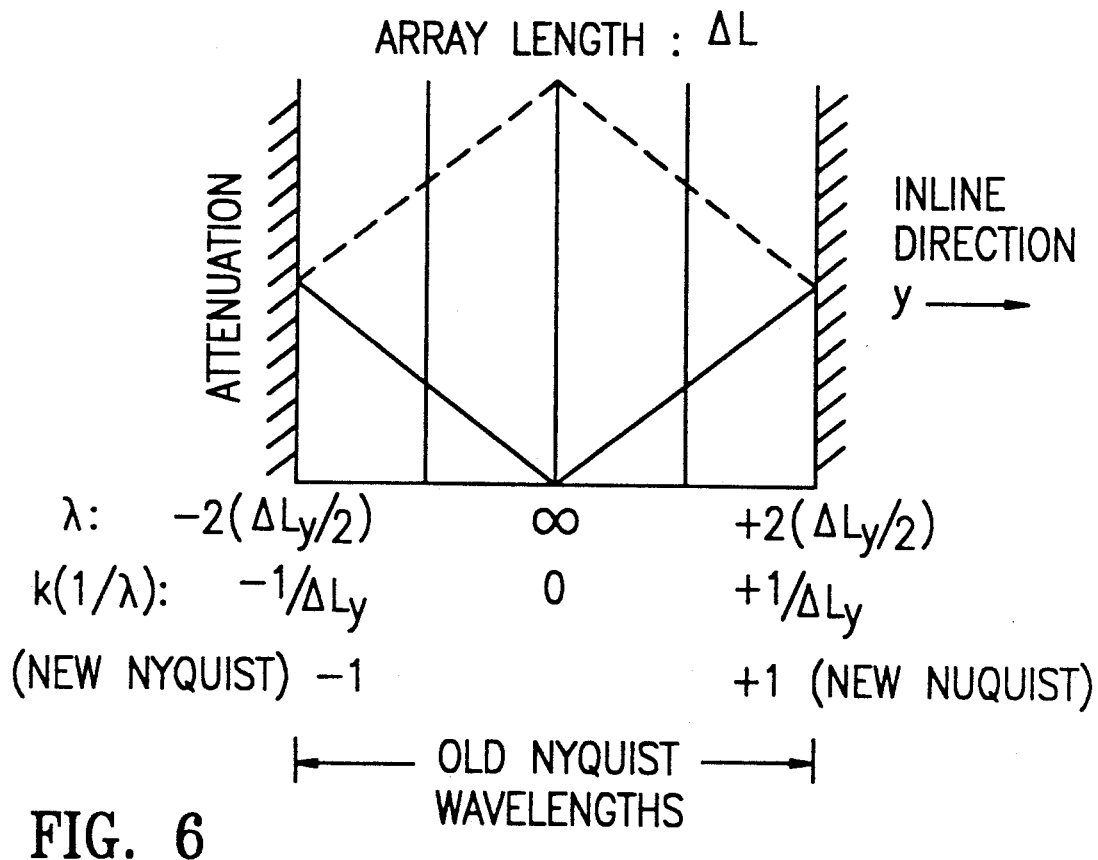

For such a broadline seismic survey, it is a specific feature of the present invention to reduce aliasing in both the inline and crossline directions by laying out the geophone arrays in the manner now to be described in conjunction with FIG. 5. In order to carry out the aliasing reducing feature, alternate broadline receiver lines are staggered by one-half group intervals as shown in FIG. 5. Each array of geophones is outlined by dashed lines and the array centers are identified by darkened circles. As can be seen, the arrays are laid out in diamond-like patterns, wherein arrays are in sequential juxtapositions along each receiver line and in juxtaposition along their sides with the arrays in adjacent receiver lines. The spatial sampling interval in the inline (y) direction is $\Delta L_y/2$, where $\Delta L_y$ is the group interval in the inline direction. Hence the Nyquist wavelength (wavenumber) is $\Delta L_y(1/\Delta L_y)$ instead of $2\Delta L_y(\frac{1}{2}\Delta L_y)$ as can be seen in FIG. 6. Since the basic array length is also $\Delta L_y$, the window for aliasing in the inline direction has been considerably reduced. It has not been completely eliminated because the arrays are weighted along both the inline and crossline directions rather than being uniformly weighted.

Figure 7:
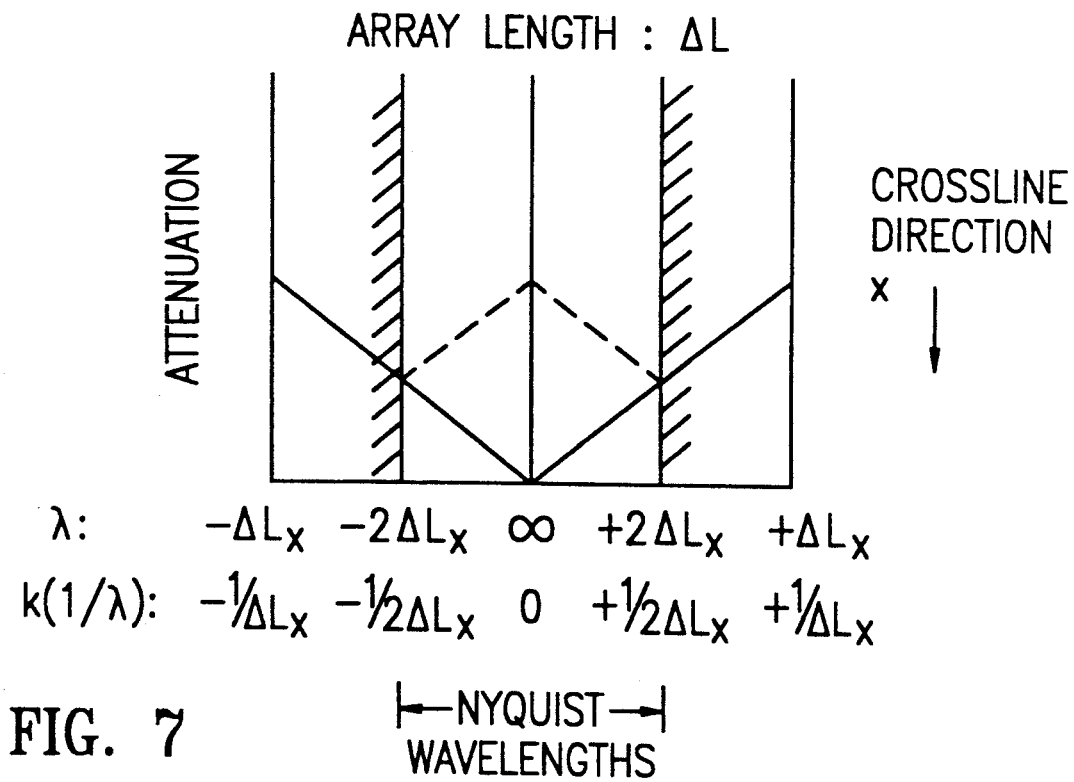

In the crossline direction, the spatial sampling interval has not been changed (at $\Delta L_x$), but the array length has been doubled to $2\Delta L_x$ as can be seen in FIG. 7. Hence array cancellation (i.e., attenuation) of wavelength has been pushed toward the Nyquist sampling wavelength.

It is unlikely that enough geophones can be deployed to avoid weighting the arrays. In order to minimize the effect of weighting, every effort must be made to maintain a uniform density of geophones both along and across the boundaries between areal geophone arrays in adjacent receiver lines. This is accomplished by selectively positioning geophones across the juxtaposed sides of arrays in adjacent receiver lines as shown in FIG. 8. A first diamond-like areal geophone array 30 in receiver line 31 is in juxtaposition along side 32 with side 33 of a second diamond-like areal geophone array 34 in adjacent and parallel receiver line 35. The geophones in array 30 are positioned in both inline and crossline directions to receiver line 31. Likewise, the geophones in array 34 are positioned in both inline and crossline directions to the parallel and adjacent receiver line 35. However, it can be seen that the inline and crossline geophones of the two arrays are staggered with respect to one another. A unit cell 40 is shown in dashed lines encompassing all geophones in the lower right quadrant of array 30 and the upper left quadrant of array 35. Inline geophones 41 and 42 of array 30, for example, are staggered in the cross-line direction across array faces 32 and 33 from inline geophones 43 and 44 of array 36. Further, cross-line geophones 4 and 45 of array 30, for example, are staggered in the inline direction across array faces 32 and 33 from cross-line geophones 43 and 46 of array 35. It is this staggering of geophones across array faces 32 and 33 that optimizes the maintenance of uniform geophone density across the arrays.

Figure 9:
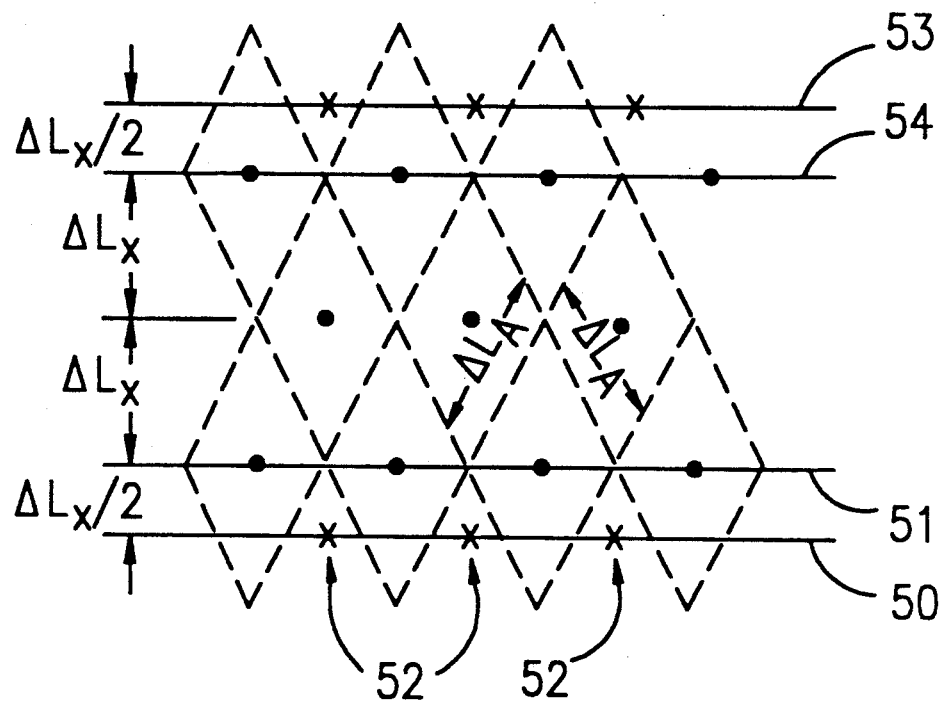
FIGS. 9 and 10 illustrate seismic energy source lines and arrays for use with the broadline geophone arrays of FIG. 5.

Referring now to FIG. 9, seismic energy is generated from a sources line 50 located parallel to and outside the receiver lines and spaced at an offset from outer receiver line 51. A plurality of seismic energy sources 52 are spaced apart along source line 50 and individually staggered in the inline direction by one-half an array interval from the receiver array centers along outer receiver line 51. The offset distance of source line 50 from the broadline center of receiver line 51 is preferably one-half of the spacing between broadline centers of adjacent receiver lines (i.e., $\frac{1}{2}\Delta L_y$). This location of source line 51 maintains uniform subsurface coverage in the cross-line direction.

An additional source line 53 may be located parallel to and outside receiver line 54 with the same offset and individual source staggering that source line 50 has with respect to receiver line 51. In this case the number of receiver lines must be odd. If an even number were used, each source in one of the receiver lines would occupy the same space as a portion of one of the receiver arrays, thus possibly resulting in equipment damage.

Figure 10:
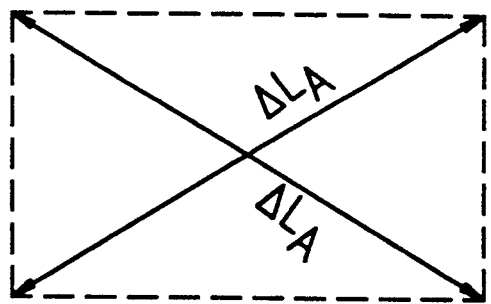

There will be spatial aliasing in the receiver grid at the apparent wavelength $\Delta L_A$ (see FIG. 9) due to the weighted geophone arrays and spacing. To counteract this spatial aliasing, source arrays should be configured to notch out this apparent wavelength. This is effected by configuring each source array such that its maximum dimension approximates $\Delta L_A$ and lies at the same two bearings to the inline direction as shown in FIG. 10.

Having now described the method of the present invention for broadline seismic data acquisition, it is to be understood by those skilled in the art that modifications and variations other than those specifically set forth may be made in the techniques described herein without departing from the spirit and scope of the invention as set forth in the appended claims.

We claim:

1. A method of broadline seismic data acquisition, comprising the steps of:
a) positioning a plurality of equal sized areal arrays of seismic detectors along each of a plurality of parallel, broadline receiver lines along the surface of the earth such that array centers along an inline direction of each receiver line are staggered by one-half of an array interval from array centers along the inline direction of adjacent receiver lines, b) elongating each detector array of a receiver line in a cross-line direction to said receiver line to effect an areal array coverage between broadline centers of the adjacent receiver lines on opposite sides of said receiver line, and c) connecting seismic detectors in each of said arrays in common to a recording means.

2. The method of claim 1 wherein seismic detectors are positioned within each of said areal arrays to maintain a uniform density of detectors within said arrays.

3. The method of claim 1 wherein seismic detectors are positioned within each of said arrays to maintain a uniform density across arrays in adjacent receiver lines.

4. The method of claim 1 wherein each of said areal arrays effects a diamond shaped areal coverage.

5. The method of claim 4 wherein the diamond shaped areal arrays are (i) in sequential juxtapositions at one of their pairs of apexes along each of said receiver lines, and (ii) in juxtaposition along their sides with the areal arrays on adjacent receiver lines.

6. The method of claim 5 wherein seismic detectors within first and second of said diamond shaped arrays which are in juxtaposition along their sides are positioned within said arrays to optimize the maintenance of a uniform density of geophones across said arrays.

7. The method of claim 6 wherein (i) the seismic detectors in said first and second arrays are positioned in inline and cross-line directions, (ii) the inline detectors of said first array are staggered from the inline detectors of said second array in a cross-line direction, and (iii) the cross-line detectors of said first array are staggered from the cross-line detectors of said second array in an inline direction.

8. The method of claim 7 further comprising the step of positioning a plurality of seismic energy sources along a pair of source lines lying parallel to said receiver lines and on opposite sides of the outer receiver lines, said sources being spaced along said source lines mid-way between detector array centers of the outer receiver lines and said source lines being offset from the broadline centers of said outer receiver lines by one-half of the offset between broadline centers of adjacent receiver lines.

9. The method of claim 8 wherein each of said seismic energy sources comprises an areal array of seismic energy generators configured with a maximum areal dimension no greater than the distance across opposite sides of said diamond shaped areal detector arrays.

10. A method of broadline seismic surveying comprising the steps of:

a) positioning a plurality of equal sized seismic detector arrays along each of a plurality of equally spaced parallel, broadline receiver lines along the surface of the earth, b) configuring the areal coverage of said detector arrays such that (i) detector array centers along an inline direction of each receiver line are staggered by one-half of a detector array interval from the array centers along the inline direction of each of the adjacent receiver lines, and (ii) detector array lengths in a cross-line direction to said receiver lines are elongated to effect an areal array coverage between broadline centers of each of said adjacent receiver lines, c) connecting seismic detectors in each of said detector arrays in common to a recording means.

d) generating seismic energy into the earth formations below said plurality of receiver lines, and e) recording seismic energy detected by said detector arrays to provide a three-dimensional seismic survey of said earth formations.

11. The method of claim 10 wherein the step of generating seismic energy comprises the steps of:

positioning a plurality of seismic energy sources along a pair of source lines being parallel to said receiver lines and on opposite sides of the outer receiver lines, said sources being spaced along said source lines mid-way between detector array centers of the outer receiver lines.

12. The method of claim 11 wherein said source lines are offset from the broadline centers of said outer receiver lines by one-half the offset between broadline centers of adjacent receiver lines.

13. The method of claim 12 wherein there are an odd number of receiver lines such that each source on one of said pair of sources lines has a corresponding source on the other of said pair of source lines in the same cross-line direction.

14. The method of claim 10 wherein the step of generating seismic energy comprises the steps of:

positioning arrays of seismic energy sources along a pair of source lines being parallel to said receiver lines and on opposite sides of the outer receiver lines, said source arrays being spaced along said source lines mid-way between detector array centers of the outer receiver lines and configured such that there is no overlap of said source arrays with said detector arrays.

15. The method of claim 14 wherein source array centers are offset from the broadline centers of the outer receiver lines by one-half of the spacing between broadline centers of adjacent receiver lines.

* * * * *